June 11, 1968 W. J. SLOUGHTER 3,388,324
ELECTRODE ARRAY METHODS AND APPARATUS, WITH UNDESIRED
INDUCED VOLTAGE CANCELLATION, FOR INVESTIGATING
EARTH FORMATIONS
Filed Sept. 23, 1965 7 Sheets-Sheet 1

United States Patent Office 3,388,324
Patented June 11, 1968

3,388,324
ELECTRODE ARRAY METHODS AND APPARATUS, WITH UNDESIRED INDUCED VOLTAGE CANCELLATION, FOR INVESTIGATING EARTH FORMATIONS
William J. Sloughter, Houston, Tex., assignor, by mesne assignments, to Schlumberger Technology Corporation, Houston, Tex., a corporation of Texas
Filed Sept. 23, 1965, Ser. No. 489,566
26 Claims. (Cl. 324—10)

This invention relates to electrical methods and apparatus for investigating subsurface earth formations traversed by a borehole and, more particularly, to such apparatus of a type utilizing current-emitting electrodes which are lowered into the borehole for passing electrical current into the subsurface earth formations for obtaining indications of the resistivity or conductivity characteristics thereof.

One manner in which subsurface earth formations are investigated is by obtaining electrical resistivity or conductivity logs using the so-called "focused" measurements.

The "focused" measurements are obtained by automatically controlling the potential and current distribution in the vicinity of an electrical logging array as it is passed through the borehole, so as to obtain desired current flow patterns. In a "focused" system, a survey current is emitted by a principal survey current-emitting electrode disposed in the borehole and this survey current is confined to a path substantially perpendicular to the borehole axis by focusing currents emitted from nearby focusing electrodes located on opposite sides of the principal electrode.

When investigating subsurface earth formations by obtaining electrical resistivity or conductivity measurements, either the voltage is maintained constant and the current variations measured, or the current is maintained constant and the voltage variations measured or a combination of the two. Whichever one of these methods is utilized, it is frequently desirable to have a constant errorless reference voltage in the downhole electrical circuitry, so that the resistivity or conductivity values may be more acurately determined. This reference voltage is obtained with respect to a remote potential reference point, which point should be free of any induced voltage from currents flowing in the ground caused by other electrodes in the investigating system. Thus, it is desirable to have the potential reference electrode placed as far a distance as possible from the other electrodes in the system so that the other electrodes in the investigating system will not set up voltage gradients in the vicinity of the potential reference electrode, which gradient has the effect of inducing an erroneous voltage in the potential reference electrode.

However, if the potential reference electrode is placed at a great distance below the other electrodes of the investigating system, it is impossible with the same set of electrodes to investigate the earth formations surrounding the bottom portion of the borehole for a distance equal to the length between the potential reference electrode and the survey electrode. On the other hand, if the potential reference electrode is placed at or near the surface of the earth, the problem arises of having an undesired voltage induced into the conductor connecting the potential reference electrode with the downhole electrical circuitry. This undesired induced voltage is mostly caused by the current emitted from the survey and focusing electrodes returning to a current-return electrode along the armor of an armored, multi-conductor cable which contains the conductor connecting the potential reference electrode with the downhole electrical circuitry. Under certain adverse borehole conditions, the magnitude of this undesired induced voltage can be as great or greater than the voltage applied to the survey and focusing electrodes, thus introducing an error of unknown magnitude in the resistivity or conductivity measurements.

Even if the undesired voltage induced into the conductor connecting the potential reference electrode with the downhole circuitry is substantially reduced, another problem may arise if the current emitted from the survey and focusing electrodes is out of phase with the voltage applied to the survey and focusing electrodes. Since the voltage induced into the conductor connecting the potential reference electrode with the downhole circuitry is induced by, and thus phase dependent on the current emitted from the survey and focusing electrodes, a phase shift in the survey and focusing current will shift the phase of the voltage induced into the conductor connecting the potential reference electrode with the downhole electrical circuitry an unknown amount. This introduces a further error of unknown magnitude into the downhole reference potential.

Since the conductor connecting the potential reference electrode at the surfce of the earth to the downhole electrical circuitry runs parallel with the conductor carrying the 60-cycle power supply current to the downhole electrical circuitry, there is also a voltage induced into the conductor connecting the potential electrode at the surface of the earth with the downhole electrical circuitry due to this 60-cycle power supply current. The voltage induced in the potential reference conductor by this current can be discriminated against in the downhole measure circuitry, but the amplifiers for supply current to the survey and focusing electrodes should be able to handle the extra current set up by the 60-cycle current, along with any current induced into the conductor connecting the potential reference electrode with the downhole electrical circuitry due to the survey and focusing current, without distorting the survey and focusing current or becoming unstable.

It is an object of the invention, therefore, to provide new and improved methods and apparatus for measuring the electrical resistance properties of earth formations adjacent to the borehole.

It is another object of the invention to provide new and improved borehole investigating methods and apparatus for providing more accurate measurements of current flow in subsurface earth formations.

It is a further object of the invention to provide new and improved borehole investigating methods and apparatus in which a more accurate downhole potential reference is maintained.

It is a still further object of the invention to provide new and improved borehole investigating methods and apparatus wherein a potential reference electrode is maintained at the surface of the earth and, at the same time, a reference voltage in the downhole electrical circuitry is maintained at a substantially constant value.

It is a still further object of the invention to provide new and improved borehole investigating methods and apparatus wherein a potential reference electrode is at the surface of the earth and a voltage induced into a conductor connecting the potential reference electrode with a downhole electrical circuitry is substantially cancelled.

It is still another object of the invention to provide new and improved borehole investigating methods and apparatus wherein an undesired induced voltage is substantially cancelled by introducing a voltage 180° out of phase with and substantially equal to the undesired induced voltage in series relationship therewith.

It is a still further object of the invention to provide new and improved borehole investigating methods and apparatus in which less gain is required from an amplifier which maintains a constant voltage with respect to a potential reference electrode on survey and focusing electrodes than has been heretofore required.

It is a still further object of the invention to provide new and improved borehole investigating methods and apparatus wherein a potential reference electrode is at the surface of the earth and, at the same time, the stability of a means for maintaining a constant voltage on survey and focusing electrodes with respect to the potential reference electrode is improved.

In accordance with one feature of the invention, apparatus for investigating earth formations comprises an electrode array adapted for movement through the borehole, the array including at least one electrode adapted to emit current into the surrounding earth formations. The investigating apparatus further includes a potential reference electrode, means for supplying current to said at least one electrode, means for controlling the current supplied to said at least one electrode in response to the voltage difference between said at least one electrode and the potential reference electrode, the voltage difference including an undesired voltage induced in the circuit connection coupling the potential reference electrode with the current controlling means, and means coupled to the current controlling means for substantially cancelling the undesired induced voltage.

In accordance with another feature of the invention, apparatus for investigating earth formations comprises an electrode array adapted for movement through the borehole, the array including at least one electrode adapted to emit current into the earth formations surrounding the borehole. The investigating apparatus further includes a potential reference electrode; means for supplying current to said at least one electrode; means for controlling the current supplied to said at least one electrode in response to the voltage difference between said at least one electrode and the potential reference electrode, the voltage difference including an undesired induced voltage, the output of the current controlling means coupled to the current supplying means; and means coupled between the potential reference electrode and the current controlling means and responsive to the output voltage from the current supplying means for substantially cancelling the undesired induced voltage.

In accordance with still another feature of the invention apparatus for investigating earth formations traversed by a borehole where a remote potential reference electrode is coupled to the investigating electrical circuitry to provide a reference potential approximating zero volts; comprises an electrode array adapted for movement through the borehole, the array including at least one electrode adapted to emit current into the surrounding earth formations and means for supplying current to said at least one electrode. The apparatus further includes monitoring means for providing an output voltage in response to the voltage difference between said at least one electrode and the potential reference electrode, the voltage difference including an undesired induced voltage; and means responsive to the output voltage from the monitoring means for substantially cancelling the undesired induced voltage.

In accordance with still another feature of the invention, a method of investigating earth formations comprises moving an electrode array through the borehole, the array including at least one electrode adapted to emit current; and supplying current to said at least one electrode for emission into the earth formations surrounding the borehole. The investigating method further comprises controlling the current supplied to said at least one electrode in response to the voltage difference between said at least one current emitting electrode and a potential reference electrode, the voltage difference including an undesired induced voltage; and cancelling a substantial portion of the undesired induced voltage.

For a better understanding of the present invention, together with other and further objects thereof, reference is had to the following description taken in connection with the accompanying drawings, the scope of the invention being pointed out in the appended claims.

Referring to the drawings.

Figure 1:
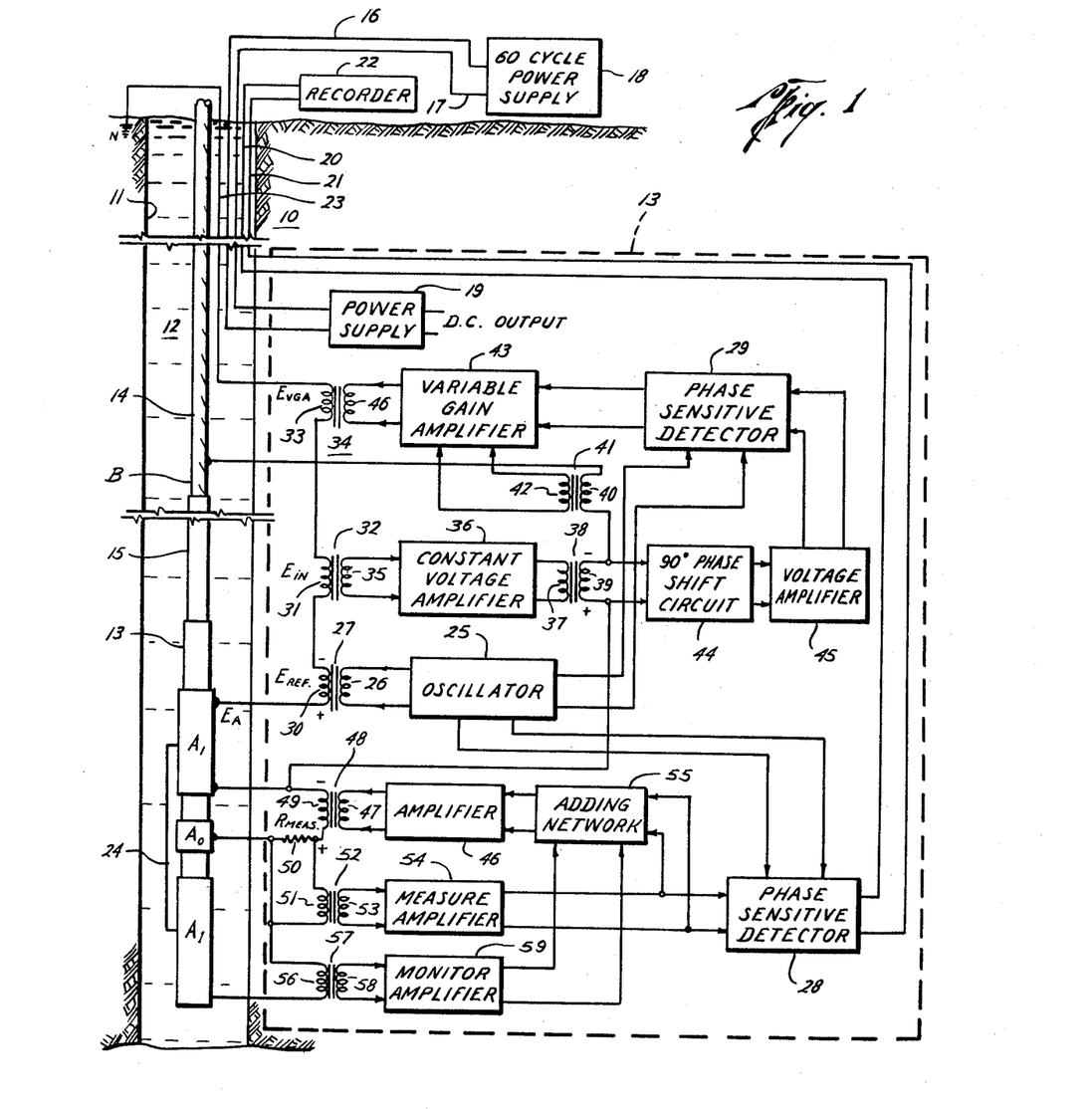
FIG. 1 illustrates an embodiment of earth formation investigating apparatus of the present invention in a borehole, together with a schematic diagram of the electrical circuitry utilized with such embodiment.

Referring to FIG. 1 of the drawings, there is shown a representative embodiment of apparatus constructed in accordance with the present invention for investigating subsurface earth formations 10 traversed by a borehole 11. Borehole 11 is filled with an electrically-conductive drilling fluid 12, commonly referred to as "drilling mud." The investigating apparatus further includes a survey electrode $A_0$ and focusing electrodes $A_1$ located adjacent to and on opposite sides of survey electrodes $A_0$. Located above survey and focusing electrodes $A_0$ and $A_1$ is a fluid-tight housing unit 13, which contains the downhole electrical circuitry. The dotted-line enclosure 13 shown to the right of the borehole in FIG. 1 represents the fluid-tight housing 13 for the purpose of showing the electrical circuitry contained therein. Survey and focusing electrodes $A_0$ and $A_1$ and fluid-tight housing 13 are suspended in the borehole 11 by an armored, multi-conductor supporting cable 14, which extends to the surface of the earth. The outside portion of the cable 14 consists of a metal armor. The lower hundred feet or so of the cable 14 immediately above housing 13 is covered by a layer of electrical insulation material 15.

Conductors 16 and 17 which connect a 60-cycle power supply 18 on the surface of the earth with a downhole power supply unit 19, conductors 20 and 21 which connect the downhole measuring equipment with a recorder 22 on the surface of the earth, and a conductor 23 which connects a potential reference electrode N at the surface of the earth with the downhole electrical circuitry and all contained within the armored, multi-conductor cable 14, but are shown in the borehole 11 outside of cable 14 for purposes of clarity. The armored, multi-conductor cable 14 is connected to a suitable winch mechanism (not shown) located at the surface of the earth which raises and lowers the downhole investigating equipment. The recorder 22 shown at the surface of the earth has associated therewithin a suitable driving mechanism (not shown) which is mechanically coupled to the supporting cable 14 for advancing the recording medium in step with movement of the downhole apparatus through the borehole 11. The armor of the armored, multi-conductor supporting cable 14 constitutes the current-return electrode B for the current emitted by survey and focusing electrodes $A_0$ and $A_1$. The connections to the downhole electrical circuitry contained within housing unit 13 from downhole power supply 19 are omitted for purposes of clarity.

Survey electrode $A_0$ emits a survey current into the earth formations surrounding the borehole for investigation thereof. Focusing electrodes $A_1$, located adjacent to and on opposite sides of survey electrodes $A_0$, are adapted to emit focusing current into the earth formations surrounding the borehole for confining the survey current to a path substantially perpendicular to the borehole axis. The focusing electrodes $A_1$ on either side of survey electrode $A_0$ are connected together by conductor 24, so as to maintain the same potential on both focusing electrodes $A_1$.

The investigation apparatus further includes an oscillator 25 which provides reference output signals to primary winding 26 of a transformer 27, a phase-sensitive detector 28, and a phase-sensitive detector 29. One side of secondary winding 30 of the transformer 27 is connected to focusing electrode $A_1$ and the other side of secondary winding 30 is connected to one side of primary winding 31 of a transformer 32. The other side of primary winding 31 is connected to one side of secondary winding 33 of a transformer 34, the other side of secondary winding 33 being connected to potential reference electrode N at the surface of the earth via conductor 23 which passes through armored multi-conductor cable 14.

Secondary winding 35 of the transformer 32 is connected to the input of constant voltage amplifier 36. The output from constant voltage amplifier 36 is connected to primary winding 37 of a transformer 38. One side of secondary winding 39 of the transformer 38 is connected to focusing electrode $A_1$. The other side of secondary winding 39 is connected to one side of primary winding 40 of a transformer 41. The other side of primary winding 40 is connected to the armor B of armored, multi-conductor cable 14. This connection to the armor B is actually made through insulated section 15. However, for purposes of clarity of the electrical schematic, the connection is shown directly on the bare metal portion of armored, multi-conductor cable 14. Secondary winding 42 of the transformer 41 is connected to variable gain amplifier 43. Secondary winding 39 of the transformer 38 is also connected to the input of a 90° phase-shift circuit 44. The output of the 90° phase-shift circuit 44 is connected to the input of a voltage amplifier 45, the output of which is connected to an input of the phase-sensitive detector 29. The output of the phase-sensitive detector 29 is connected to one input of the variable gain amplifier 43, the output of which is connected to primary winding 46 of the transformer 34.

The investigating apparatus further includes an amplifier 46 whose output is connected to primary winding 47 of a transformer 48. One side of secondary winding 49 of the transformer 48 is connected to focusing electrode $A_1$ and the other side is connected to one side of a measure resistor 50. The other side of measure resistor 50 is connected to survey electrode $A_0$. Also connected across measure resistor 50 is primary winding 51 of a transformer 52. Secondary winding 53 of the transformer 52 is connected to the input of a measure amplifier 54. One output of the measure amplifier 54 is connected to an input of an adding network 55. The output of the adding network 55 is connected to the input of the amplifier 46. The output of the measure amplifier 54 is also connected to an input of the phase-sensitive detector 28. The output of the phase-sensitive detector 28 is connected via conductors 20 and 21 through armored, multi-conductor cable 14 to the recorder 22 at the surface of the earth. One side of primary winding 56 of transformer 57 is connected to survey electrode $A_0$ and the other side of primary winding 56 is connected to focusing electrode $A_1$. Secondary winding 58 of the transformer 57 is connected to the input of monitor amplifier 59, whose output is connected to an input of adding network 55.

Considering now the operation of the FIG. 1 apparatus, the potentials of survey electrode $A_0$ and focusing electrodes $A_1$ are maintained substantially equal to one another and at a constant value with respect to potential reference electrode N which is located at the surface of the earth. Constant voltage amplifier 36 supplies a signal to primary winding 37 of transformer 38, which signal is induced in secondary winding 39 thereof and applied between focusing electrode $A_1$ and the armor of armored, multiconductor cable 14 via primary winding 40 of transformer 41.

Oscillator 25 supplies a voltage to primary winding 26 of transformer 27, which signal is of constant voltage magnitude. Thus, the voltage $E_{ref}$ induced across secondary winding 30 of transformer 27 is a constant voltage signal, that is, the voltage differenc between the two sides of secondary winding 30 will remain the same. Since secondary winding 30 of transformer 27 is connected between focusing electrode $A_1$ and one side of the primary winding 31 of transformer 32, the voltage difference between focusing electrode $A_1$ and one side of the primary winding 31 of transformer 32 will always be the same. The voltage on potential reference electrode N at the surface of the earth is applied to the other side of primary winding 31 of transformer 32 via conductor 23 through armored, multi-conductor cable 14 and secondary winding 33 of transformer 34, which applied voltage should have a value of zero volts if operating conditions are perfect.

It can be seen from the polarity markings on the secondary winding 39 of transformer 38 and secondary winding 30 of transformer 27 that the reference voltage $E_{ref}$ developed across secondary winding 30 of transformer 27 is subtracted from the voltage applied to focusing electrode $A_1$ from secondary winding 39 of transformer 38, as far as primary winding 31 of transformer 32 is concerned. Secondary winding 35 of transformer 32, in effect, monitors the voltage applied to focusing electrode $A_1$ by secondary winding 39 of transformer 38 along with a constant reference voltage $E_{ref}$ developed across the secondary 30 of transformer 27. The difference between the voltages applied to opposite sides of primary winding 31 of transformer 32, $E_{in}$, is induced into the secondary winding 35 of transformer 32 and applied to constant voltage amplifier 36. The value of $E_{in}$ will be the difference, then, between the voltage $E_N$ from potential reference electrode N on one side of primary winding 31 of transformer 32 and the voltage $E_A - E_{ref}$ on the other side of primary finding 31. Constant voltage amplifier 36 applies a constant voltage gain to the applied input voltage $E_{in}$ and supplies an output voltage to transformer 38, which voltage is induced in secondary winding 39 thereof, and applied between focusing electrode $A_1$ and the armor of armored, multi-conductor cable 14.

Thus, it can be seen that through this feed-back action, the voltage $E_A$ of focusing electrode $A_1$ should always be constant with respect to potential reference electrode N and have a voltage magnitude substantially equal to the reference voltage $E_{ref}$, assuming perfect operating conditions; that is, the perfect operating conditions including the fact that the voltage on potential reference electrode N is the same as the potential reference applied through conductor 23 and secondary winding 33 of transformer 34 to primary winding 31 of transformer 32. As the voltage $E_A$ on focusing electrode $A_1$ tends to vary from this value, the input to primary winding 31 of transformer 32 from secondary winding 30 of transformer 27 will likewise vary, thus causing a change in the output voltage from constant voltage amplifier 36 of sufficient magnitude to bring the focusing electrode $A_1$ back to substantially the desired voltage. For example, as the voltage $E_A$ on focusing electrode $A_1$ tends to decrease, the magnitude of voltage $E_A - E_{ref}$ applied to primary winding 31 of transformer 32 will tend to increase ($E_A$ is slightly smaller than $E_{ref}$), thus increasing the voltage $E_{in}$ applied to transformer 32, thus increasing the voltage output of constant voltage amplifier 36, thus bringing the voltage $E_A$ on focusing electrode $A_1$ back to substantially the desired constant value. Since the gain of constant voltage amplifier 36 is not infinite, the voltage applied to one side of primary winding 31 of transformer 32 is slightly higher than the other side to enable constant voltage amplifier 36 to provide the required output voltage.

The purpose of the circuitry comprising transformer 57, monitor amplifier 59, adding network 55, amplifier 46, transformer 48, and measure resistor 50, transformer 52, measure amplifier 54 back to adding network 55, is to maintain the voltage on survey electrode $A_0$ substantially equal to the voltage on focusing electrode $A_1$. The voltages on survey electrode $A_0$ and focusing electrode $A_1$ are supplied to opposite sides of primary winding 56 of transformer 57. A voltage proportional to the difference of the voltages on survey and focusing electrodes $A_0$ and $A_1$ is induced in secondary winding 58 of transformer 57, amplified by monitor amplifier 59 and applied to one input of adding network 55. The output of adding network 55 is applied to amplifier 46 whose output is applied to primary winding 47 of transformer 48 and induced in secondary winding 49 thereof. The voltage induced in secondary winding 49 is applied between focusing electrode $A_1$ and through measure resistor 50 to survey electrode $A_0$. Current set up by the voltage $E_A$ on focusing electrode $A_1$ will pass through secondary winding 49 of transformer 48 to survey electrode $A_0$, but due to the resistance in secondary winding 49 of transformer 48, there will be a voltage drop across secondary winding 49 from this current. As seen by the polarity markings of secondary winding 49 of transformer 48 and secondary winding 39 of transformer 38, the voltage output from amplifier 46 tends to replenish the above-mentioned voltage drop, thus making the voltage on survey electrode $A_0$ substantially equal to the voltage on focusing electrode $A_1$. This voltage equality is maintained by transformer 57 monitoring the potential difference between survey electrode $A_0$ and focusing electrode $A_1$, this potential difference being amplified by monitor amplifier 59 and applied through adding network 55 to amplifier 46 which induces a voltage in secondary winding 49 of transformer 48 of such magnitude and polarity as to reduce the potential difference between survey electrode $A_0$ and focusing electrode $A_1$ substantially to zero.

The total current emitted from survey electrode $A_0$ passes through measure resistor 50. The voltage developed across measure resistor 50 is applied to transformer 52, amplified by measure amplifier 54 and applied to adding network 55. By the action of this positive feed-back loop comprising transformer 52, measure amplifier 54 to adding network 55, the voltage loss across measure resistor 50 is applied back to amplifier 46, thus nullifying the voltage loss across measure resistor 50. The combination of this positive feed-back loop along with the negative feed-back loop comprising transformer 57, monitor amplifier 59 to adding network 55 maintains the voltage on survey electrode $A_0$ substantially the same as the voltage on survey electrode $A_1$.

Since the total current emitted from survey electrode $A_0$ passes through measure resistor 50, the voltage developed across measure resistor 50, applied to transformer 52 and amplified by measure amplifier 54 is proportional to the current emitted from survey electrode $A_0$, which current is proportional to the conductivity of the surrounding earth formation. This output from measure amplifier 54 is fed to phase-sensitive detector 28 to which also is supplied a phase reference signal from oscillator 25. Phase-sensitive detector 28 detects that magnitude of the applied signal from measure amplifier 54 which is in phase with the reference signal from oscillator 25, and provides a DC output signal via conductors 20 and 21 to recorder 22 at the surface of the earth, which DC output signal is proportional to the conductivity of the surrounding earth formation.

For a more detailed explanation of the feed-back circuits associated with amplifier 46, see U.S. Patent No. 3,031,612, granted to M. F. Easterling on Apr. 24, 1962.

It can now be seen that the potential reference voltage applied to one side of the primary winding 31 of transformer 32 from potential reference electrode N should always be a constant, known voltage. The accuracy of the resistivity or conductivity measurements is dependent on the voltage of survey electrode $A_0$ being always constant so that the current variations can be accurately determined. If the voltage on survey electrode $A_0$ should vary, the current emitted from survey electrode $A_0$ will vary by an amount proportional to the variation of the voltage on survey electrode $A_0$. Since this variation in voltage on survey electrode $A_0$ is unknown, and the investigating system assumes a constant voltage, the magnitude of the DC output signal from phase-sensitive detector 28 will likewise be in error by an unknown amount. However, it has been found that by placing the potential reference electrode N a great distance from the survey and focusing electrodes $A_0$ and $A_1$ and the current-return electrode B for the survey and focusing current, the voltage gradient in the vicinity of the potential reference electrode N is substantially zero, thus maintaining the potential reference electrode N at a substantially constant voltage of zero volts. However, it is undesirable to place the potential reference electrode N at a great distance below the survey and focusing electrodes, since it would become impossible to investigate the earth formations surrounding the bottom portion of the borehole for a distance equal to the distance between the potential reference electrode N and the survey electrode $A_0$. Therefore, the potential reference electrode N must be placed a great distance above the survey and focusing electrodes $A_0$ and $A_1$, the greatest distance possible being at the surface of the earth.

A problem arises from at least two sources, however, if the potential reference electrode N is placed at the surface of the earth. The conductor 23 connecting primary winding 31 of transformer 32 with potential reference electrode N must run through the armored, multi-conductor cable 14 for the entire distance between housing unit 13 and the surface of the earth. The current $I_A$ emitted from the survey and focusing electrodes $A_0$ and $A_1$ returns to the armor B of the armored, multi-conductor cable 14 above the insulation 15 and travels along the armor B to housing unit 13, where the armor B is connected to the downhole circuitry. This current $I_A$ traveling through the armor B induces a voltage $E_N$ of unknown magnitude in the conductor 23 connecting the potential reference electrode N at the surface of the earth with the downhole electrical circuitry. This induced voltage $E_N$ is applied to the primary winding 31 of transformer 32, thus introducing an error of unknown magnitude in the voltage $E_A$ applied to focusing electrode $A_1$ from secondary winding 39 of transformer 38. This, then, introduces an error into the resistivity or conductivity measurements.

Under certain borehole conditions, as for example, when the resistivity of the earth strata immediately above the survey and focusing electrodes $A_0$ and $A_1$ is much higher than the resistivity of the strata adjacent to the survey and focusing electrodes $A_0$ and $A_1$, the survey and focusing current $I_A$ will return to the armor B of armored, multi-conductor cable 14 a greater distance above the survey and focusing electrodes $A_0$ and $A_1$ than under normal conditions, thus introducing a much greater induced voltage $E_N$ into the conductor 23 connecting potential reference electrode N with the downhole electrical circuitry. Under these above-described conditions, the magnitude of the voltage $E_N$ induced into the conductor 23 connecting potential reference electrode N with the downhole circuitry can be several times higher than the reference voltage $E_{ref}$, thus introducing a very large error into the resistivity or conductivity measurements.

The magnitude of this induced voltage $E_N$ can be decreased somewhat by lowering the frequency of oscillator 25. However, as long as alternating current is utilized in the investigation of subsurface earth formations and the potential reference electrode N is located at the surface of the earth, the problem will be present.

Another problem arises due to an undesired voltage induced into conductor 23 from a current in conductors 16 and 17 which supply power from 60-cycle power supply 18 at the surface of the earth to power supply unit 19 in housing unit 13. Since phase-sensitive detector 28, which supplies the DC output signal proportional to conductivity, is frequency and phase referenced from oscillator 25, which frequency is fixed somewhat higher or lower than the 60-cycle power supply frequency, phase-sensitive detector 28 will not detect the 60-cycle voltage. However, constant voltage amplifier 36 must be capable of handling the 60-cycle applied voltage without distorting the investigating voltage supplied from oscillator 25.

Looking now at FIGS. 4(a-e) there are shown vector diagram representations of some of the voltages and currents present in the investigating equipment. FIG. 4(a) shows the vector representations present in the FIG. 1 apparatus under perfect operating conditions; that is, when there is no induced voltage $E_N$ on conductor 23. The vectors $E_A$, $E_{in}$ (except for FIG. 4(e)), and $I_A$ are actually pointing in the opposite direction than shown in FIG. 4(a-e), but are drawn in the directions shown for purposes of clarity of the vector diagrams. Thus, minus signs are placed before the vectors $E_A$, $E_{in}$, and $I_A$ in FIG. 4(a-e), except $E_{in}$ in FIG. 4(e). There is shown the vector quantity $E_{ref}$ representing the reference voltage across the secondary winding 30 of transformer 27. $E_{ref}$ is used as the vector reference for the other vectors of the FIG. 1 system. The voltage $-E_A$ represents the voltage present on focusing electrode $A_1$, which voltage is substantially the same as the voltage present on survey electrode $A_0$. The vector $(-E_A)$ is shown in phase with $E_{ref}$ and of substantially the same magnitude, the only difference in magnitude between the vectors $E_{ref}$ and $-E_A$ being due to the fact that constant voltage amplifier 36 cannot have an infinite gain and thus the feed-back loop must supply some small voltage of a magnitude dependent on the gain of constant voltage amplifier 36 back to the input of constant voltage amplifier 36. This is the voltage across primary winding 31 of transformer 32, which vector is designated $-E_{in}$. Thus, from FIG. 4(a) the vector equation $(-E_A)+(-E_{in})=E_{ref}$ can be written. Under these perfect operating conditions, the voltage $-E_A$ supplied to focusing and survey electrodes $A_0$ and $A_1$ will always be constant and the resistivity or conductivity of the surrounding earth formations may be accurately determined.

Figure 4A:
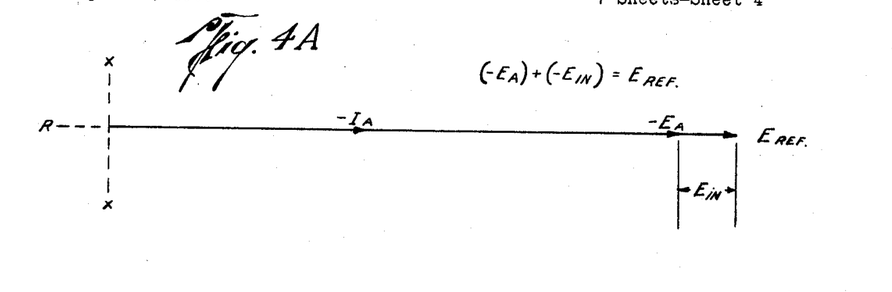
FIGS. 4(a)–4(e) illustrate vector diagram representations of the electrical operation of portions of the different embodiments.
Figure 4B:
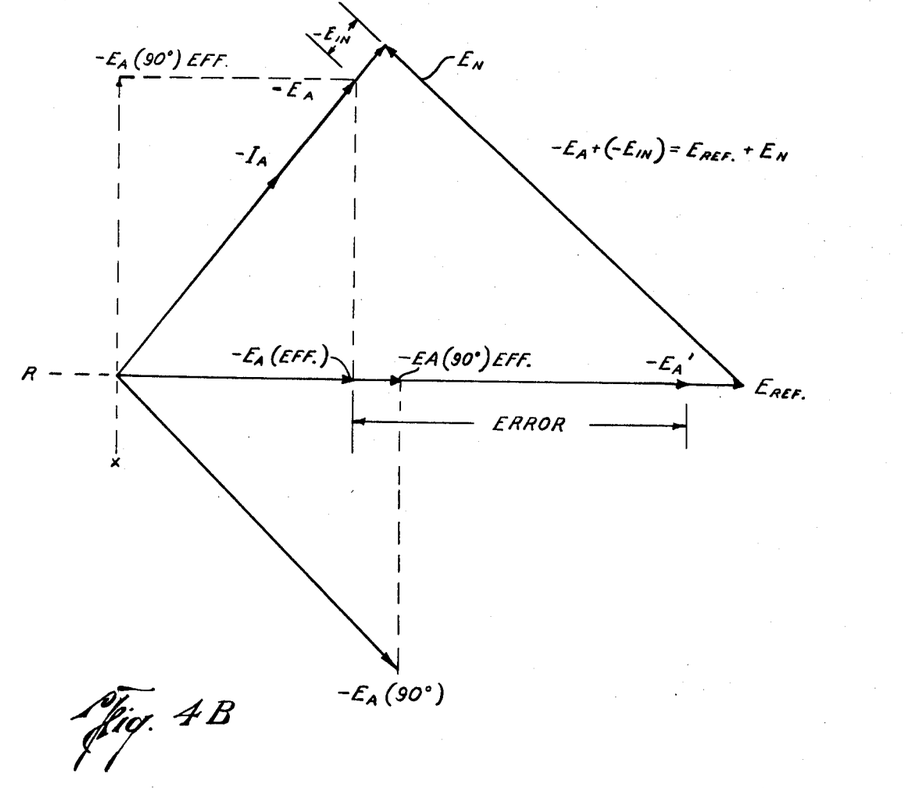

Now looking at FIG. 4(b), there is shown a voltage $E_N$, which is the voltage induced into conductor 23 due to the survey and focusing current $I_A$ traveling along the armor B of armored, multi-conductor cable 14. The voltage $E_N$ induced into conductor 23 by the survey and focusing current $I_A$ traveling through the armor B is determined by the relationship $E_N=jwMI_A$ where $j$ is a phase quadrature vector operator, $w$ the frequency multiplied by $2\pi$, M the coefficient of coupling between conductor 23 and the armor B, and $I_A$ the survey and focusing current traveling through the armor B. Thus, the vector $E_N$ is always 90° out of phase with the survey and focusing current $I_A$. In the vector diagram of FIG. 4(b), survey and focusing current vector $-I_A$ is assumed to be in phase with the voltage vector $-E_A$ on survey and focusing electrodes $A_0$ and $A_1$. Thus, the induced error voltage $E_N$, being 90° out of phase with $-I_A$, is also 90° out of phase with $-E_A$. The vector $-E_A'$ represents the voltage on the survey and focusing electrodes $A_0$ and $A_1$ under the perfect operating conditions of FIG. 4(a), that is, it represents the position vector $-E_A$ should have to obtain accurate resistivity or conductivity measurements.

Since, in the FIG. 1 apparatus, phase-sensitive detector 28 is phase referenced with respect to oscillator 25, whose outputs have the same phase as reference voltage $E_{ref}$, the voltage $-E_A$ on survey and focusing electrodes $A_0$ and $A_1$ has a vector component $-E_{A(eff)}$, which is the effective voltage on the survey and focusing electrodes $A_0$ and $A_1$ as far as the measure circuits are concerned. In other words, as far as the resistivity or conductivity measurements are concerned, the voltage on the survey and focusing electrodes $A_0$ and $A_1$ is represented by the vector $-E_{A(eff)}$. Thus, as shown in FIG. 4(b), the measurement error is the difference in magnitude between the desired voltage vector $-E_A'$ and the actual effective voltage vector $-E_{A(eff)}$. Therefore, if the vectors are in the positions shown in FIG. 4(b) the measured resistivity or conductivity will be in error by over 100%. If the survey and focusing current vector $-I_A$ should differ in phase from the voltage vector $-E_A$ on the survey and focusing electrodes $A_0$ and $A_1$, the magnitude of the error will change also, thus introducing further unknowns into the measurements.

Now referring back to FIG. 1, this error due to induced voltage on conductor 23 from the survey and focusing current $I_A$ traveling along the armor B is substantially minimized by the circuitry comprising 90° phase-shift circuit 44, voltage amplifier 45, phase-sensitive detector 29, variable gain amplifier 43, transformer 34 and transformer 41. The signal from constant voltage amplifier 36, which is induced in secondary winding 39 of transformer 38 and applied between focusing electrode $A_1$ and the armor B of armored, multi-conductor cable 14, is also applied to 90° phase-shift circuit 44. The voltage applied to 90° phase-shift circuit 44 is the voltage vector $-E_A$ of FIG. 4(b). This vector $-E_A$ is shifted in phase 90 degrees by 90° phase-shift circuit 44, amplified by voltage amplifier 45, and applied to phase-sensitive detector 29, to which also is applied a phase-reference voltage from oscillator 25. Phase-sensitive detector 29 detects the component of the applied voltage from voltage amplifier 45 which is in phase with the reference voltage from oscillator 25 and provides a DC output signal to variable gain amplifier 43 proportional to this in-phase component of the applied voltage from voltage amplifier 45.

To better illustrate this detecting operation, refer to FIG. 4(b). The survey and focusing voltage vector $-E_A$ is shown shifted in phase 90 degrees, the 90° phase-shifted vector designated $-E_{A(90°)}$. Since the reference voltage $E_{ref}$ from oscillator 25 is on the R axis, the component of the vector $-E_{A(90°)}$ on the R axis is detected and is designated $-E_{A(90°)eff}$ in FIG. 4(b). Shifting the vector $-E_A$ by 90 degrees and detecting the component on the R axis has the same effect as detecting the component of $-E_A$ that lies on the X axis. This is designated $-E_{A(90°)eff}$ also.

Referring back to FIG. 1, the survey and focusing current $I_A$ returning through the armor B of armored, multi-conductor cable 14 to secondary winding 39 of transformer 38 passes through primary winding 40 of transformer 41 inducing a voltage in secondary winding 42 thereof, which voltage is applied to variable gain amplifier 43. This voltage from secondary winding 42 of transformer 41 is amplified by variable gain amplifier 43 and applied to transformer 34 where it is induced in secondary winding 33 thereof. Since the survey and focusing current $I_A$ varies in magnitude depending on borehole conditions, thus varying the voltage induced in secondary winding 42 of transformer 41, variable gain amplifier 43 includes a standard voltage limiting or clipping circuit to hold this excitation voltage constant. Also, since the cancellation voltage $E_{VGA}$ must be 180° out of phase with the undesired induced voltage $E_N$ and a 90° phase shift is introduced in transformer 41 between $I_A$ and the voltage induced in secondary winding 42 thereof, variable gain amplifier 43 and transformer 34 must have practically no additional phase shift. The gain of variable gain amplifier 43 is controlled by the DC output signal from phase-sensitive detector 29. Thus, the magnitude of the voltage $E_{VGA}$ induced in secondary winding 33 of transformer 34 is dependent on the DC output signal from phase-sensitive detector 29. The voltage $E_{VGA}$ induced across secondary winding 33 of transformer 34 acts to substantially minimize the undesired induced voltage $E_N$.

Since the undesired induced voltage $E_N$ is phase dependent on the survey and focusing current $I_A$ and the excitation for variable gain amplifier 43 is also phase dependent on $I_A$, $I_A$ being the current in primary winding 40 of transformer 41, the voltage $E_{VGA}$ induced in secondary winding 33 of transformer 34 is 180 degrees out of phase with the undesired induced voltage $E_N$, both $E_N$ and $E_{VGA}$ being 90 degrees out of phase with $I_A$. Because the gain of the undesired induced voltage cancellation loop comprising transformer 32, constant voltage amplifier 36, transformer 38, 90° phase-shift circuit 44, voltage amplifier 45, phase-sensitive detector 29, variable gain amplifier 43, transformer 34, and back to transformer 32, cannot be infinite, $E_N$ will be slightly larger in magnitude than $E_{VGA}$ thus leaving a very small negligible error.

Looking at FIGS. 1 and 4(b) in conjunction, it can be seen that the DC output vector $-E_{A(90°)eff}$ from phase-sensitive detector 29 controls the gain of variable gain amplifier 43 in such a way as to induce a voltage $E_{VGA}$ in secondary winding 33 of transformer 34 that reduces the undesired induced voltage $E_N$ substantially to zero. If there is no undesired induced voltage $E_N$, the voltage vector $-E_A$ on the survey and focusing electrodes $A_0$ and $A_1$ will be in phase with the reference voltage $E_{ref}$ and when $-E_A$ is shifted 90 degrees by 90° phase-shift circuit 44, it will be located on the X axis. Thus the detected component $-E_{A(90°)eff}$ from phase-sensitive detector 29 will be zero, thus providing zero gain to variable gain amplifier 43, and no voltage will be induced in the secondary winding 33 of transformer 34. In the same manner, when there is an undesired induced voltage $E_N$, a substantially equal and opposite voltage $E_{VGA}$ will be induced in secondary winding 33 of transformer 34 since there is a DC voltage output from phase-sensitive detector 29. In other words, the undesired induced voltage cancellation loop will always act to reduce the DC output from phase-sensitive detector 29 substantially to zero.

Figure 4C:
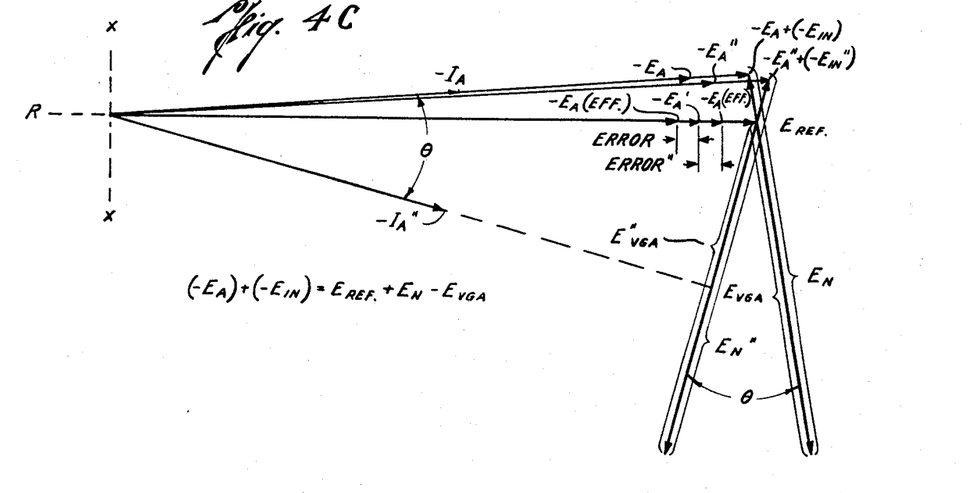

To better illustrate the operation of the undesired induced voltage cancellation circuit, refer to FIG. 4(c). There is shown the undesired induced voltage vector $E_N$ pointing in an upward direction and the cancellation voltage vector $E_{VGA}$ pointing in a downward direction. Because the gain of the undesired induced voltage cancellation loop is not infinite, $E_N$ is somewhat greater in magnitude than $E_{VGA}$. Thus, the voltage vector $-E_A$ on the survey and focusing electrodes $A_0$ and $A_1$ is slightly out of phase with the reference voltage $E_{ref}$.

The vector equation for FIG. 4(c) can be written $(-E_A)+(-E_{in})=E_{ref}+E_N-E_{VGA}$. The resultant of $E_N-E_{VGA}$ is the undesired voltage of the investigating system. Because of this resultant undesired voltage $E_N-E_{VGA}$, the voltage vector $-E_A$ is slightly out of phase with the reference voltage $E_{ref}$. The in-phase component $-E_{A(eff)}$ of $-E_A$ is slightly less in magnitude than the desired voltage $-E_A'$ which is present on the survey and focusing electrodes $A_0$ and $A_1$ when there is no undesired induced voltage. The measurement error in this case is the difference in magnitude between $-E_{A(eff)}$, which error is very small since the undesired induced voltage is reduced by a factor approximately equal to the gain of the undesired induced voltage cancellation loop.

Now consider the case when the survey and focusing current vector $-I_A$ is out of phase with the survey and focusing voltage vector $-E_A$. Still referring to FIG. 4(c), this phase difference is represented by the angle $\theta$, which shifts the survey and focusing current vector $-I_A$ to a new vector position designated $-I_A''$. Since the undesired induced voltage $E_N$ and the cancellation voltage $E_{VGA}$ are both phase dependent on the survey and focusing current vector $-I_A''$, both $E_N$ and $E_{VGA}$ will be 90 degrees out of phase with $-I_A''$, thus shifting $E_N$ and $E_{VGA}$ by the angle $\theta$ to new vector locations designated $E_N''$ and $E_{VGA}''$. This changes the vector sum $(-E_A)+(-E_{in})$ to a new vector position designated $(-E_A'')+(-E_{in}'')$, thus changing the survey and focusing voltage $-E_A$ to a new vector location designated $-E_A''$. Thus, the in-phase component of the survey and focusing voltage is shifted to a new location designated $-E_A''_{(eff)}$. The measurement error for this case is the difference between $-E''_{A(eff)}$ and $-E_A'$ which is designated error''.

Thus, it can be seen that the in-phase component $-E_{A(eff)}$ of the survey and focusing voltage $-E_A$ will oscillate on either side of the desired voltage $-E_A'$, as the survey and focusing current $-I_A$ varies in phase with the survey and focusing voltage $-E_A$. Therefore, the measurement error will be relatively small under all borehole conditions. It can be seen that by driving variable gain amplifier 43 from the survey and focusing current $I_A$, the cancellation voltage $E_{VGA}$ is on the same axis as the undesired induced voltage $E_N$, thus reducing the measurement error to a minimum even when the survey and focusing current vector $-I_A$ shifts in phase from the survey and focusing voltage, as shown by the vector diagram of FIG. 4(c).

Figure 2:
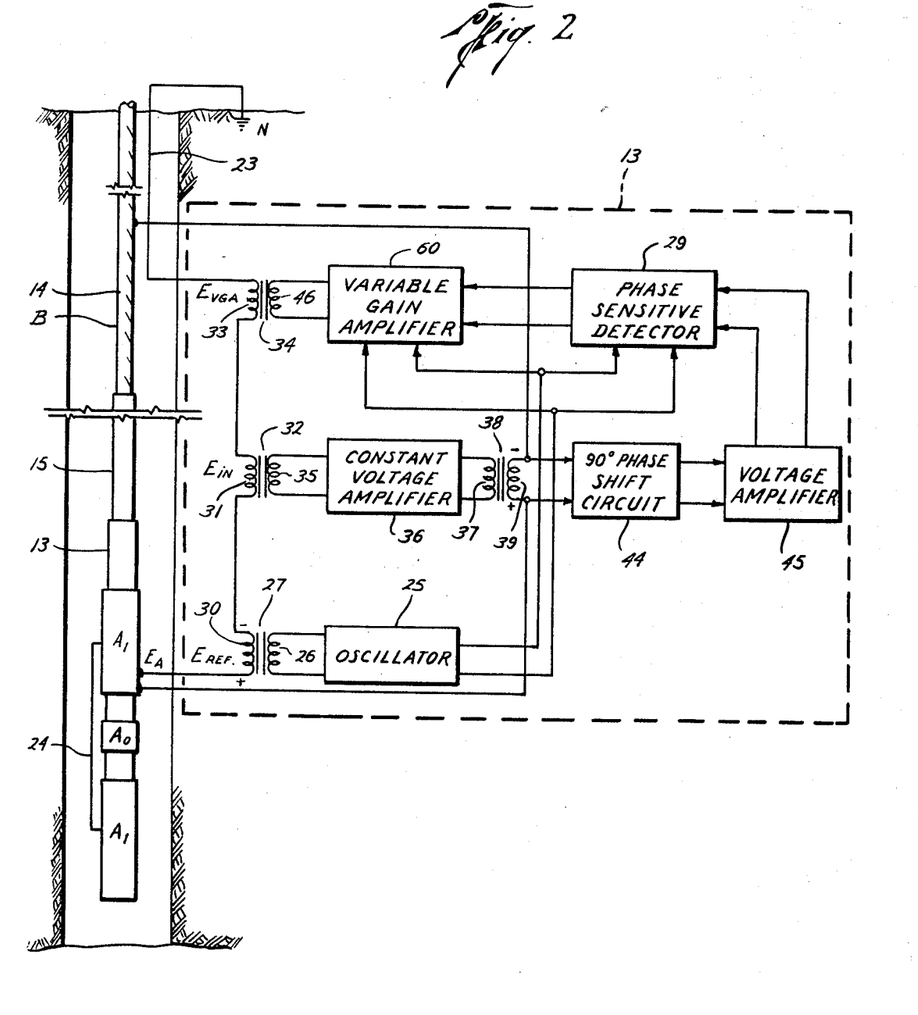
FIG. 2 illustrates another embodiment of the earth formation investigating apparatus of the present invention showing the electrodes together with a schematic diagram of a portion of the electrical circuitry utilized with such embodiment.

Referring now to FIG. 2, there is shown a second embodiment of the present invention. Only the apparatus necessary for the explanation of this embodiment of the invention are shown in FIG. 2. The circuitry of FIG. 1 for maintaining the voltage of survey electrode $A_0$ substantially the same as the voltage on focusing electrode $A_1$ and the measure circuitry are considered a part of the FIG. 2 embodiment though not shown in FIG. 2. In the FIG. 2 apparatus, the conductor from one side of secondary winding 39 of transformer 38 to the armor B of armored, multi-conductor cable 14 does not pass through the primary winding 40 of transformer 41 as in the FIG. 1 apparatus, but instead is directly connected to the armor B. In addition, one output from oscillator 25 is connected to variable gain amplifier 60 in place of the secondary winding 42 of transformer 41 of the FIG. 1 apparatus. Other than this change in the excitation source for the variable gain amplifier, the FIG. 1 and FIG. 2 apparatus are identical.

The operation of FIG. 2 apparatus is substantially the same as the operation of the FIG. 1 apparatus except that the excitation voltage for variable gain amplifier 60 is taken from oscillation 25 rather than from the survey and focusing current $I_A$. The voltage $E_{VGA}$ induced into secondary winding 33 of transformer 34 tends to substantially reduce the undesired induced voltage $E_N$ in the same manner as in the FIG. 1 apparatus. Because the excitation voltage supplied from oscillator 25 has a constant magnitude, there is no need to have a voltage limiting circuit in variable gain amplifier 60, as in variable gain amplifier 43 in the FIG. 1 embodiment. Also, variable gain amplifier 60 will have a high impedance output so that transformer 34 can provide the necessary 90° phase shift to enable $E_{VGA}$ to be 90 degrees out of phase with $E_{ref}$ for cancellation of the undesired induced voltage $E_N$. An example of such a high impedance output would be to utilize a pentode output stage, which would allow transformer 34 to provide a 90° phase shift to the applied voltage $E_{ref}$.

Figure 4D:
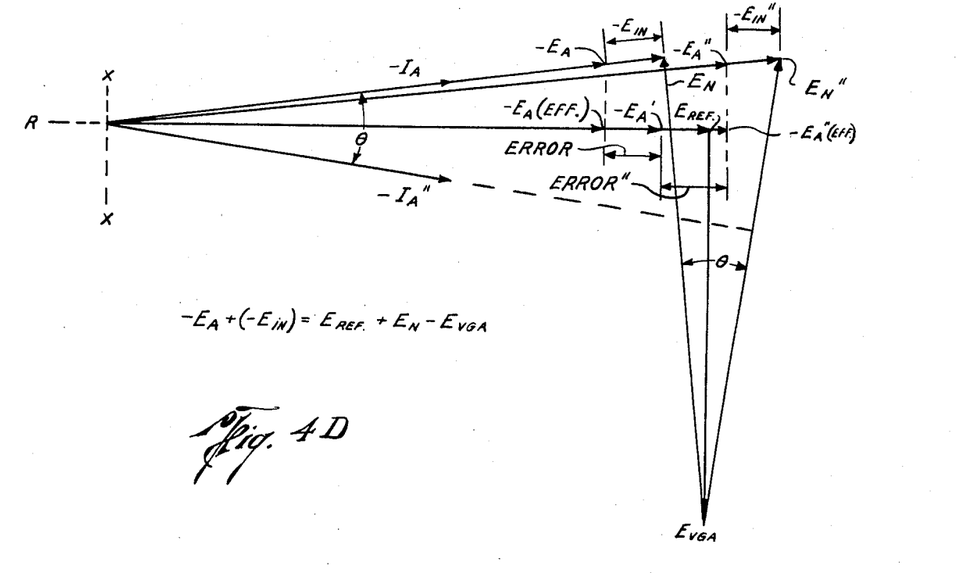

To better illustrate the operation of the FIG. 2 apparatus, refer to FIG. 4(d). The undesired induced voltage $E_N$ is 90 degrees out of phase with the survey and focusing current vector $-I_A$ for the same reason as in the FIG. 1 apparatus. The survey and focusing current vector $-I_A$ is assumed in phase with the survey and focusing voltage vector $-E_A$. However, since the excitation for variable gain amplifier 60 is obtained from oscillator 25 rather than from the survey and focusing current $I_A$, the cancellation voltage $E_{VGA}$ will be phase dependent on the reference voltage $E_{ref}$ rather than the survey and focusing current $I_A$. The cancellation voltage $E_{VGA}$ is adjusted so as to be 90 degrees out of phase with the reference voltage $E_{ref}$ to obtain maximum undesired induced voltage cancellation for this embodiment.

It can be seen that the undesired induced voltage $E_N$ pivots about the cancellation voltage vector $E_{VGA}$ since $E_{VGA}$ is not on the same vector axis as $E_N$. This introduces more error into the resistivity or conductivity measurements than the apparatus of FIG. 1 in which both $E_N$ and $E_{VGA}$ pivot about the reference voltage vector $E_{ref}$. For the case where the survey and focusing current vector $-I_A$ is in phase with the survey and focusing voltage vector $-E_A$, the difference in magnitude between the in-phase component $-E_{A(eff)}$ of the actual survey and focusing voltage $E_A$ and the desired survey and focusing voltage $-E_A'$ represents the measurement error of the system. For the case where the survey and focusing current vector $-E_A$ by an angle $\theta$ to the new vector location $-I_A''$, the undesired induced voltage $E_N$ will shift in phase by the angle $\theta$ to the new vector location $E_N''$ so as to remain 90 degrees out of phase with $-I_A''$. The difference in magnitude between the in phase component $-A_{(eff)}''$ of $-E_A''$ and $-E_A'$ represents the measurement error for this case and is designated error''. Thus, $-E_{A(eff)}$ will oscillate on both sides of $-E_A'$ as $-I_A$ differs in phase from $-E_A$.

Referring now to FIGS. 4(c) and 4(d) in conjunction, the reference voltage $E_{ref}$ has the same magnitude in both FIGS. 4(c) and 4(d). The undesired induced voltage $E_N$ also has the same magnitude in both FIGS. 4(c) and 4(d). It can be seen from FIGS. 4(c) and 4(d) that, while the apparatus of FIG. 2 shown vectorially in FIG. 4(d) substantially reduces the measurement error due to the undesired induced voltage $E_N$, the apparatus of FIG. 1 shown vectorially in FIG. 4(c) provides a greater degree of cancellation of the measurement error, since the cancellation voltage $E_{VGA}$ lies on the same axis as the undesired induced voltage $E_N$. However, limiting or clipping of the excitation voltage supplied to variable gain amplifier 60 is not required in the FIG. 2 apparatus as it is for variable gain amplifier 43 of FIG. 1, since a constant reference voltage from oscillator 25 is utilized in the FIG. 2 apparatus.

Figure 3:
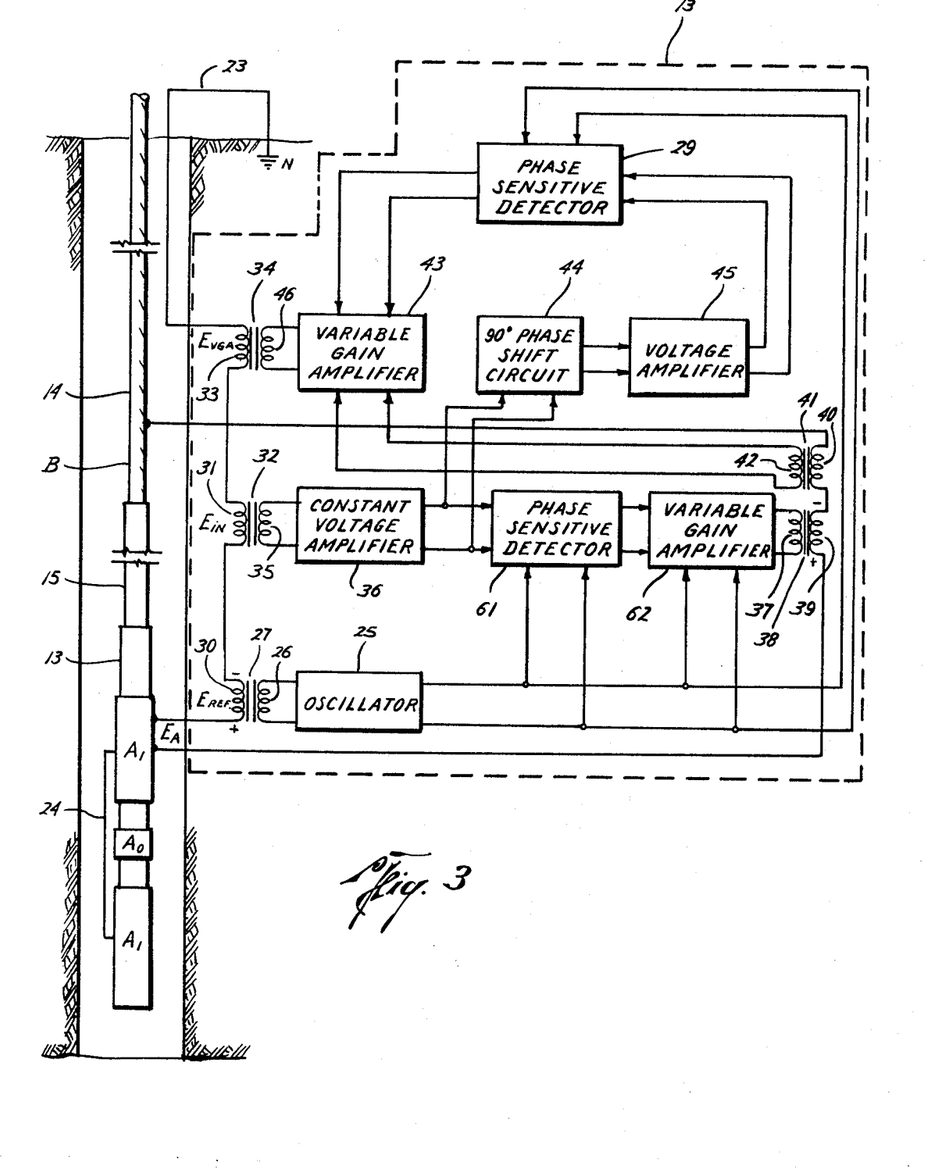
FIG. 3 illustrates still another embodiment of earth formation investigating apparatus of the present invention, showing the electrodes together with a schematic diagram of a portion of the electrical circuitry utilized with such embodiment.

Referring now to FIG. 3, there is shown a third embodiment of the present invention. The circuitry for maintaining the voltage on survey electrode $A_0$ substantially the same as that on focusing electrode $A_1$ and the measure circuits have been omitted for brevity, but are the same as shown in the FIG. 1 embodiment.

In the FIG. 3 embodiment, the output voltage from constant voltage amplifier 36 is not supplied to transformer 38 as in the FIG. 1 embodiment but is supplied directly to phase-sensitive detector 61, to which also is supplied a reference signal from oscillator 25. The output from phase-sensitive detector 61 is supplied to variable gain amplifier 62, to which also is supplied a reference signal from oscillator 25. The output from variable gain amplifier 62 is supplied to primary winding 37 of transformer 38. One side of the secondary winding 39 of transformer 38 is connected to focusing electrode $A_1$ and the other side of secondary winding 39 is supplied to the armor B of armored, multi-conductor cable 14 through the primary winding 40 of transformer 41. The excitation for variable gain amplifier 43 is obtained from the survey and focusing current $I_A$ through transformer 41, which excitation voltage is limited to a given magnitude, as in the FIG. 1 apparatus. The output from constant voltage amplifier 36 is also supplied directly to 90° phase-shift circuit 44, whose output is supplied to voltage amplifier 45. The output from voltage amplifier 45 is supplied to phase-sensitive detector 29, to which also is supplied a reference signal from oscillator 25. The output signal from phase-sensitive detector 29 is supplied to variable gain amplifier 43. The connections to transformers 27, 32 and 34 are the same as in the FIG. 1 embodiment.

The circuitry comprising constant voltage amplifier 36, 90° phase-shift circuit 44, voltage amplifier 45, phase-sensitive detector 29 and variable gain amplifier 43 operates in the same manner as does the same circuitry in FIG. 1. That is to say, the output voltage from constant voltage amplifier 36 is shifted in phase 90 degrees by 90° phase-shift circuit 44 and the component of voltage output from voltage amplifier 45, which is in phase with the reference voltage from oscillator 25, is detected by phase-sensitive detector 29, which provides a DC output voltage proportional to this detected voltage component. The DC output from phase-sensitive detector 29 controls the gain of variable gain amplifier 43, and thus the gain of the excitation voltage from a secondary winding 42 of transformer 41 is controlled by the DC output from phase-sensitive detector 29 as in FIG. 1.

The frequency of oscillator 25 has been decreased from the frequency normally used in the investigation of subsurface earth formations by electrode systems of the "focused" type, so as to reduce the magnitude of the undesired induced voltage in conductor 23. For example, where a 280-cycle oscillator was previously used, a 90-cycle oscillator may now be used. However, in reducing the frequency of oscillator 25, it becomes increasingly difficult to maintain the stability of constant voltage amplifier 36 and still maintain the same power output. In addition, the induced voltage from conductors 16 and 17 (shown in FIG. 1) which carry the 60-cycle current from power supply 18 at the surface of the earth to downhole power supply 19 puts a further strain on constant voltage amplifier 36. While some filtering can be included in the input of voltage amplifier 36, a substantial 60-cycle voltage will remain and constant voltage amplifier 36 must be able to handle the 60-cycle power without distorting the 90-cycle investigation signal. But, to increase the filtering or increase the power requirements of constant voltage amplifier 36 would add to the problem of maintaining stability in the system. Thus, it is desirable to decrease the power requirements of constant voltage amplifier 36 so that there is no chance of constant voltage amplifier 36 becoming unstable at 90-cycles, or an even lower frequency, if desired.

To solve this problem, the portion of output voltage from constant voltage amplifier 36, which is in phase with the reference voltage $E_{ref}$ from oscillator 25, is detected by phase-sensitive detector 61 and a DC output signal proportional to this in-phase component is supplied to variable gain amplifier 62. This DC output signal from phase-sensitive detector 61 controls the gain of variable gain amplifier 62. Thus the excitation voltage from oscillator 25 is amplified by a factor determined by the DC signal from phase-sensitive detector 61. The output from variable gain amplifier 62 is supplied via transformer 38 between focusing electrode $A_1$ and the armor B of armored, multi-conductor cable 14 through primary winding 40 of transformer 41. In this manner, the voltage $E_A$ on focusing electrode $A_1$ is maintained constant, but the power requirements on constant voltage amplifier 36 are substantially decreased.

Since the excitation for variable gain amplifier 62 is derived from oscillator 25, the voltage $E_A$ applied to focusing electrode $A_1$ will always be in phase with the reference voltage $E_{ref}$, regardless of the magnitude of undesired induced voltage $E_N$. The undesired induced voltage $E_N$ and the cancellation voltage $E_{VGA}$ will be 90 degrees out of phase with the survey and focusing current $I_A$ as in the FIG. 1 apparatus due to deriving the excitation voltage for variable gain amplifier 43 from the survey and focusing current $I_A$.

Figure 4E:
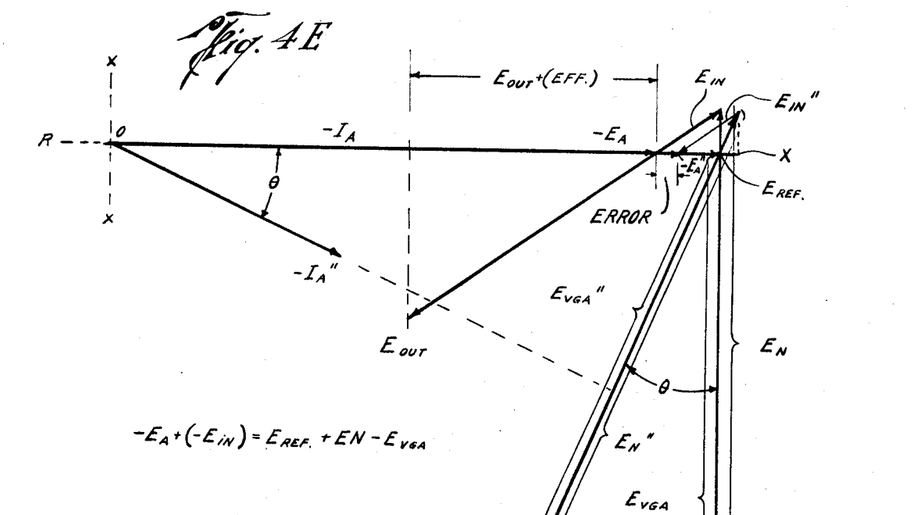

To better explain the operation of the FIG. 3 apparatus, refer to FIG. 4(e). The survey and focusing voltage vector $-E_A$ is shown in phase with reference voltage $E_{ref}$ for the reasons explained above. For the case where the survey and focusing current vector $-I_A$ is in phase with the survey and focusing voltage vector $-E_A$, the undesired induced voltage $E_N$ and the cancellation voltage $E_{VGA}$ are both at 90 degrees to $-I_A$, $-E_A$ being slightly greater in magnitude than $E_{VGA}$ since the cancellation loop gain cannot be infinite. The voltage $E_{in}$ developed across primary winding 31 of transformer 32 is located between the resultant $E_N - E_{VGA}$ and $-E_A$. The output of constant voltage amplifier 36, which is in phase with $E_{in}$, designated $E_{out}$. The component of $E_{out}$, which is in phase with $E_{ref}$, designated $E_{out(eff)}$, is the DC output signal from phase-sensitive detector 61, which controls the gain of variable gain amplifier 62. The survey and focusing voltage vector $-E_A$ will remain at the desired level regardless of the magnitude of the resultant of $E_N - E_{VGA}$, unless variable gain amplifier 43 becomes saturated. However, as long as the cancellation voltage $E_{VGA}$ is placed in series with $E_N$, it is highly improbable that variable gain amplifier 43 will ever become oversaturated. Thus, it can be seen that there is virtually no measurement error in the FIG. 3 embodiment for the case of survey and focusing current vector $-I_A$ in phase with survey and focusing voltage vector $-E_A$.

When the survey and focusing current vector $-I_A$ differs in phase from the survey and focusing voltage vector $-E_A$ by the angle $\theta$, shifting the survey and focusing current vector $-I_A$ to a new vector location $-I_A''$, $E_N$ and $E_{VGA}$ will shift by the same angle $\theta$ to remain 90 degrees out of phase with $-I_A''$. The new vector locations of $E_N$ and $E_{VGA}$ are designated $E_N''$ and $E_{VGA}''$. To determine the new vector location of $-E_A$, the component of the resultant of $E_N'' - E_{VGA}''$ which is on the R axis is determined. This point is designated X. The ratio of $-E_A$ to $E_{ref}$ is equal to the ratio of $-E_A''$ to the total distance from zero to X. The measurement error is the distance between $-E_A$ and $-E_A''$. It can be seen that, even for the case of $-I_A$ out of phase with $-E_A$, the measurement error remains relatively small for all practical purposes.

The FIG. 3 embodiment may also include obtaining the excitation for variable gain amplifier 43 from oscillator 25 as in the FIG. 2 embodiment rather than from the survey and focusing current vector $-I_A$. In this case, however, looking at FIG. 4(e), when $-I_A$ is out of phase with $-E_A$, $E_N''$ would pivot around the bottom $E_{VGA}''$, thus introducing a greater error than when excitation is derived from $-I_A''$.

It can be seen that the measurement error with the FIG. 3 embodiment tends to be slightly less than either the FIG. 1 or FIG. 2 embodiments. However, the FIG. 1 and FIG. 2 embodiments utilize less circuitry and equipment than the FIG. 3 embodiment, which is advantageous since weight and space in the downhole housing unit 13 are at a premium.

Figure 5:
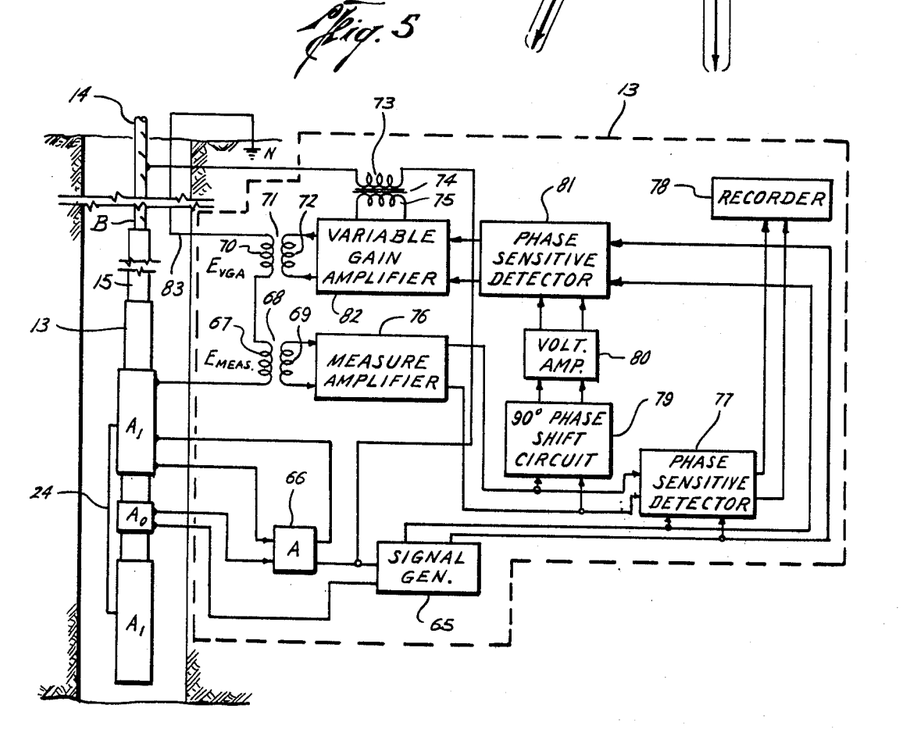
FIG. 5 illustrates another embodiment of earth formation investigating apparatus of the present invention, showing the electrodes together with a schematic diagram of the electrical circuitry utilized with such embodiment.

Looking now at FIG. 5, there is shown the undesired induced voltage cancelling features of the present invention applied to a constant current circuit. As in the constant voltage embodiment, the potential reference electrode N is located at the surface of the earth, the current return electrode B is on the armor of the armored, multi-conductor cable 14, and a focused system is utilized.

Signal generator 65 is shown connected to survey electrode $A_0$. The return for signal generator 65 is connected to one side of the primary winding 73 of transformer 74. The input to an amplifier 66 is connected between survey electrode $A_0$ and focusing electrode $A_1$. The output of amplifier 66 is connected between focusing electrode $A_1$ and one side of the primary winding 73 of transformer 74. The other side of primary winding 73 is connected to current return electrode B on the armor of armored, multi-conductor cable 14. The secondary winding 75 of transformer 74 is connected to a variable gain amplifier 82. Focusing electrode $A_1$ is also connected to one side of primary winding 67 of a transformer 68. The other side of primary winding 67 is connected to one side of primary winding 70 of a transformer 71. The other side of primary winding 70 is connected to remote potential reference electrode N at the surface of the earth through armored, multi-conductor cable 14. Secondary winding 69 of transformer 68 is connected to a measure amplifier 76. One output of measure amplifier 76 is connected to a phase-sensitive detector 77 to which also is applied a phase reference signal from signal generator 65. The output of the phase-sensitive detector 77 is connected to a recorder 78 at the surface of the earth through armored, multi-conductor cable 14. Another output of measure amplifier 76 is connected to 90° phase-shift circuit 79, the output of which is connected to a voltage amplifier 80. The output of voltage amplifier 80 is connected to phase-sensitive detector 81, to which also is applied a phase reference signal from signal generator 65. The output of phase-sensitive detector 81 is connected to variable gain amplifier 82. The output of variable gain amplifier 82 is connected to primary winding 72 of transformer 71.

The FIG. 5 embodiment operates to supply a constant current to survey electrode $A_0$ and monitor the variations in voltage on survey electrode $A_0$ to obtain the resistivity or conductivity measurements with respect to remote potential reference electrode N. Signal generator 65 supplies a constant current to survey electrode $A_0$. Amplifier 66 monitors the difference in potential between survey electrode $A_0$ and focusing electrode $A_1$ and supplies an output current between focusing electrodes $A_1$ and current return electrode B of such a magnitude as to maintain the voltage on focusing electrode $A_1$ the same as the voltage on survey electrode $A_0$.

The variations in voltage on electrodes $A_0$ and $A_1$, which provide an indication of the resistivity of the surrounding earth formations, are developed across primary winding 67 of transformer 68, induced in secondary winding 69 thereof, and applied to measure amplifier 76. Thus, it can be seen that the voltage difference between survey and focusing electrodes $A_0$ and $A_1$, and remote potential reference electrode N is applied to primary winding 67 of transformer 68. Measure amplifier 76 supplies a voltage indicative of this voltage difference to phase-sensitive detector 77, which provides a DC output to recorder 78 at the surface of the earth which is indicative of that portion of the output voltage from measure amplifier 76 which is in phase with the output voltage from signal generator 65.

For the same reasons as in the FIG. 1 embodiment, an undesired voltage is likely to be induced on conductor 82 connecting potential reference electrode N with the downhole electrical circuitry, which introduces an error in the resistivity measurements for the same reasons as in the FIG. 1 embodiment. To cancel this undesired induced voltage, an output of measure amplifier 76 is applied to 90° phase-shift circuit 79, whose output is applied to voltage amplifier 80. The output of voltage amplifier 80 is applied to phase-sensitive detector 81, which detects that portion of the applied voltage from voltage amplifier 80 that is in phase with the voltage from signal generator 65. The DC output from phase-sensitive detector 81 controls the gain of variable gain amplifier 82 to the excitation voltage applied to variable gain amplifier 82 from the secondary winding 75 to transformer 74 in the same manner as the FIG. 1 embodiment. The output of variable gain amplifier 82 is applied to primary winding 72 of transformer 71 and induced in secondary winding 70 thereof, and substantially cancels the undesired induced voltage on conductor 82 in the same manner as the FIG. 1 embodiment.

The excitation for variable gain amplifier 82 in the FIG. 5 embodiment could also be obtained from signal generator 65 in the same manner as the FIG. 2 embodiment.

Figure 6:
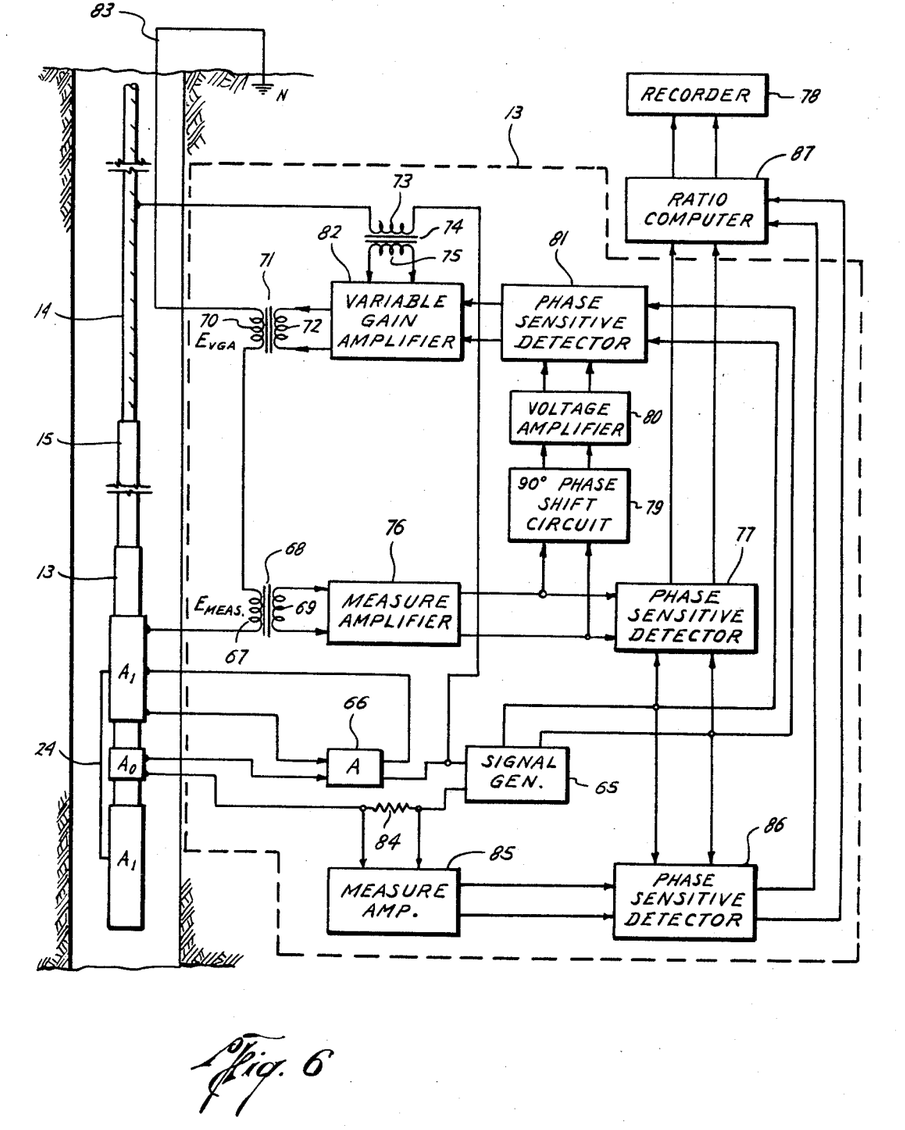
FIG. 6 illustrates still another embodiment of the present invention, showing the electrodes together with a schematic diagram of the electrical circuitry utilized with such embodiment.

Referring to FIG. 6, there is shown the undesired induced voltage cancellation features of the present invention applied to a variable voltage and current circuit. The apparatus of FIG. 6 is identical to the apparatus of FIG. 5, with a few exceptions, and has the same numbers for the same apparatus. The differences of the FIG. 6 circuit are that a resistor 84 is inserted in the conductor connecting signal generator 65 with survey electrode $A_0$. In addition, the input of a measure amplifier 85 is connected across resistor 84, the output of measure amplifier 85 being connected to a phase-sensitive detector 86 which derives its phase signal from signal generator 65. Also, the output from phase-sensitive detector, instead of being connected directly to recorder 78, is connected to a ratio computer 87, whose output is supplied to recorder 78. The output of phase-sensitive detector 86 is also supplied to ratio computer 87.

The FIG. 6 apparatus would operate in the same manner as the FIG. 5 apparatus except that signal generator 65 of FIG. 6 would not have to maintain a constant current output. The varying current from signal generator 65 develops a voltage in resistor 84 which is proportional to the current therein. After amplification by measure amplifier 85, phase-sensitive detector 86 detects the magnitude of applied voltage which is in phase with the phase reference signal from signal generator 65 and applies a DC signal to ratio computer 87. Ratio computer 87 determines the resistivity or conductivity of the surrounding earth formations from the signals from phase-sensitive detectors 77 and 86, the output of phase-sensitive detector 77 being indicative of voltage and the output of phase-sensitive detector 86 being indicative of current. The undesired induced voltage is cancelled in the same manner as in the FIG. 5 embodiment.

A ratio computer for computing resistivity or conductivity from signals representative of varying values of voltage and current is shown in U.S. Patent No. 2,921,253 granted to W. Liben on Jan. 12, 1960.

In both the constant current, constant voltage, and variable voltage and current embodiments, a constant reference potential from remote reference potential electrode N is supplied to downhole electrical circuitry. In the constant voltage circuit, the constant reference potential from remote potential reference electrode N is utilized to maintain a constant voltage with respect to that remote potential reference electrode N on survey and focusing electrodes $A_0$ and $A_1$. In the constant current and variable voltage and current circuits, a constant reference potential is obtained from remote potential reference electrode N so that the voltage on survey and focusing electrodes $A_0$ and $A_1$ may be accurately determined with respect to that constant reference potential. In all embodiments, an undesired induced voltage is likely to be present on the conductor connecting potential reference electrode N with the downhole electrical circuitry, which undesirable voltage causes large errors in the resistivity or conductivity measurements.

Thus, it can be seen that in both the constant current, constant voltage, and variable voltage and current embodiments of the present invention, the undesirable induced voltage is substantially cancelled through the operation of the present invention.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. In apparatus for investigating earth formations traversed by a borehole, the combination comprising:
   (a) an electrode array adapted for movement through the borehole, the array including at least one electrode adapted to emit current into the surrounding earth formations;
   (b) a potential reference electrode;
   (c) means for supplying current to said at least one electrode;
   (d) means for controlling the current supplied to said at least one electrode in response to the voltage difference between said at least one electrode and the potential reference electrode, the voltage difference including an undesired voltage induced in the circuit connection coupling the potential reference electrode with the current controlling means; and
   (e) means coupled to the current controlling means for substantially cancelling the undesired induced voltage.

2. In apparatus for investigating earth formations traversed by a borehole, the combination comprising:
   (a) an electrode array adapted for movement through the borehole, the array including at least one electrode adapted to emit current into the surrounding earth formations;
   (b) a potential reference electrode located a considerable distance from said at least one electrode;
   (c) means for supplying current to said at least one electrode;
   (d) means for controlling the current supplied to said at least one electrode in response to the voltage difference between said at least one electrode and the potential reference electrode, the voltage difference including an undesired voltage induced in the circuit connection coupling the potential reference electrode with the current controlling means; and
   (e) means coupled to the current controlling means for substantially cancelling the undesired induced voltage.

3. In apparatus for investigating earth formations traversed by a borehole, the combination comprising:
   (a) an electrode array adapted for movement through the borehole, the array including at least one electrode adapted to emit current into the surrounding earth formations;
   (b) a potential reference electrode located near the surface of the earth;
   (c) means for supplying current to said at least one electrode;
   (d) means for controlling the current supplied to said at least one electrode in response to the voltage difference between said at least one electrode and the potential reference electrode, the voltage difference including an undesired voltage induced in the circuit connection coupling the potential reference electrode with the current controlling means; and
   (e) means coupled to the current controlling means for substantially cancelling the undesired induced voltage.

4. In apparatus for investigating earth formations traversed by a borehole, the combination comprising:
   (a) an electrode array adapted for movement through the borehole, the electrodes including at least one electrode adapted to emit current into the surrounding earth formations;
   (b) a potential reference electrode;
   (c) means for supplying current of a first phase to said at least one electrode;
   (d) means for controlling the current supplied to said at least one electrode in response to the voltage difference between said at least one electrode and the potential reference electrode, the voltage difference including an undesired voltage induced in the circuit connection coupling the potential reference electrode with the current controlling means; and
   (e) means coupled to the current controlling means for substantially cancelling any undesired induced voltage in phase quadrature with supplied current.

5. In apparatus for investigating earth formations traversed by a borehole, the combination comprising:
  (a) an electrode array adapted for movement through the borehole, the array including at least one electrode adapted to emit current into the earth formations surrounding the borehole;
  (b) a potential reference electrode;
  (c) means for supplying current to said at least one electrode;
  (d) means for controlling the current supplied to said at least one electrode in response to the voltage difference between said at least one electrode and the potential reference electrode, the voltage difference including an undesired induced voltage, the output of the current controlling means coupled to the current supplying means; and
  (e) means coupled between the potential reference electrode and the current controlling means and responsive to the output voltage from the current controlling means for substantially cancelling the undesired induced voltage.

6. In apparatus for investigating earth formations traversed by a borehole, the combination comprising:
  (a) an electrode array adapted for movement through the borehole, the array including at least one electrode adapted to emit current into the surrounding earth formations;
  (b) a potential reference electrode;
  (c) means for supplying current to said at least one electrode;
  (d) means for controlling the current supplied to said at least one electrode in response to the voltage difference between said at least one electrode and the potential reference electrode, the voltage difference including an undesired voltage induced in the circuit connection coupling the potential reference electrode with the current controlling means, the output of the current controlling means coupled to the current supplying means; and
  (e) means coupled between the potential reference electrode and the current controlling means and responsive to the output voltage from the current controlling means for substantially cancelling the undesired induced voltage.

7. In apparatus for investigating earth formations traversed by a borehole, the combination comprising:
  (a) an electrode array adapted for movement through the borehole, the array including at least one electrode adapted to emit current into the earth formations surrounding the borehole;
  (b) a potential reference electrode located near the surface of the earth;
  (c) means for supplying current of a first phase to said at least one electrode;
  (d) means for controlling the current supplied to said at least one electrode in response to the voltage difference between said at least one electrode and the potential reference electrode, the voltage difference including an undesired voltage in approximate phase quadrature with the emitted current induced in the conductor coupling the potential reference electrode with the current controlling means, the output of the current controlling means coupled to the current supplying means; and
  (e) means coupled between the potential reference electrode and the current controlling means and responsive to the output voltage from the current controlling means for substantially cancelling any undesired induced voltage in phase quadrature with the supplied current.

8. In apparatus for investigating earth formations traversed by a borehole, the combination comprising:
  (a) an electrode array adapted for movement through the borehole, the array including at least one electrode adapted to emit current into the earth formations surrounding the borehole;
  (b) a potential reference electrode;
  (c) means for supplying current to said at least one electrode;
  (d) means for controlling the current supplied to said at least one electrode in response to the voltage difference between said at least one electrode and the potential reference electrode, the voltage difference including an undesired induced voltage, the output of the current controlling means coupled to the current applying means;
  (e) means responsive to the output voltage from the current controlling means for supplying a signal substantially proportional to the undesired induced voltage; and
  (f) means coupled between the potential reference electrode and the current controlling means and responsive to the signal from the last-named means for substantially cancelling the undesired induced voltage.

9. In apparatus for investigating earth formations traversed by a borehole, the combination comprising:
  (a) an electrode array adapted for movement through the borehole, the array including at least one electrode adapted to emit current into the earth formations surrounding the borehole;
  (b) a potential reference electrode located near the surface of the earth;
  (c) means for supplying current to said at least one electrode;
  (d) means for controlling the current supplied to said at least one electrode in response to the voltage difference between said at least one electrode and the potential reference electrode, the voltage difference including an undesired voltage induced in the conductor coupling the potential reference electrode with the current controlling means, the output of the current controlling means coupled to the current supplying means;
  (e) means responsive to the output voltage from the current controlling means for supplying a signal substantially proportional to the undesired induced voltage; and
  (f) means coupled between the potential reference electrode and the current controlling means and responsive to the signal from the last-named means for substantially cancelling the undesired induced voltage.

10. In apparatus for investigating earth formations traversed by a borehole, the combination comprising:
  (a) an electrode array adapted for movement through the borehole, the array including at least one electrode adapted to emit current into the surrounding earth formations;
  (b) a potential reference electrode;
  (c) means for supplying current to said at least one electrode;
  (d) means for controlling the current supplied to said at least one electrode in response to the voltage difference between said at least one electrode and the potential reference electrode, the voltage difference including an undesired voltage induced in the circuit connection coupling the potential reference electrode with the current controlling means, the output of the current controlling means coupled to the current supplying means; and
  (e) means responsive to the output voltage from the current controlling means for inserting a voltage which is 180 degrees out of phase with and substantially equal to the undesired induced voltage, in series relationship with the undesired induced voltage.

11. In apparatus for investigating earth formations traversed by a borehole, the combination comprising:
  (a) an electrode array adapted for movement through the borehole, the array including at least one electrode adapted to emit current into the earth formations surrounding the borehole;
  (b) a potential reference electrode;
  (c) means for supplying current to said at least one electrode;
  (d) means for controlling the current supplied to said at least one electrode in response to the voltage difference between said at least one electrode and the potential reference electrode, the voltage difference including an undesired induced voltage, the output of the current controlling means coupled to the current suplying means;
  (e) means responsive to the emitted current for providing a signal which is phase dependent on the phase of the emitted current;
  (f) means responsive to the output voltage from the current controlling means for providing a signal indicative of the undesired induced voltage; and
  (g) means coupled between the potential reference electrode and the current controlling means and responsive to the signals from the last two named means for substantially cancelling the undesired induced voltage.

12. In apparatus for investigating earth formations traversed by a borehole, the combination comprising:
  (a) an electrode array adapted for movement through the borehole, the array including at least one electrode adapted to emit current into the earth formations surrounding the borehole;
  (b) a potential reference electrode;
  (c) means for supplying current to said at least one electrode;
  (d) an oscillator having an output voltage;
  (e) means for controlling the current supplied to said at least one electrode in response to the voltage difference between said at least one electrode and the potential reference electrode, the voltage difference including an undesired induced voltage and the output voltage of the oscillator, the output of the current controlling means coupled to the current supplying means; and
  (f) means coupled between the potential reference electrode and the current controlling means and responsive to the output voltage from the current controlling means and the oscillator output voltage for substantially cancelling the undesired induced voltage.

13. In apparatus for investigating earth formations traversed by a borehole, the combination comprising:
  (a) an electrode array adapted for movement through the borehole, the array including at least one electrode adapted to emit current into the earth formations surrounding the borehole;
  (b) a potential reference electrode;
  (c) means for supplying current to said at least one electrode;
  (d) an oscillator having an output voltage;
  (e) means for controlling the current supplied to said at least one electrode in response to the voltage difference between said at least one electrode and the potential reference electrode, the voltage difference including an undesired induced voltage and the output voltage of the oscillator, the output of the current controlling means coupled to the current supplying means;
  (f) means responsive to the output voltage from the current controlling means for providing an output signal substantially proportional to the component of the voltage supplied to said at least one electrode which is in phase quadrature with the oscillator output voltage; and
  (g) means coupled between the potential reference electrode and the current controlling means and responsive to the output signal from the last-named means for substantially cancelling the undesired induced voltage.

14. In apparatus for investigating earth formations traversed by a borehole, the combination comprising:
  (a) an electrode array adapted for movement through the borehole, the array including at least one electrode adapted to emit current into the earth formations surrounding the borehole;
  (b) a potential reference electrode;
  (c) means for supplying current to said at least one electrode;
  (d) an oscillator having an output voltage;
  (e) monitoring means for providing an output voltage in response to the voltage difference between said at least one electrode and the potential reference electrode, the voltage difference including an undesired induced voltage and the output voltage of the oscillator;
  (f) means coupled to the oscillator and responsive to the output voltage from the monitoring means for controlling the current supplied to said at least one electrode, the voltage of which is maintained at a fixed phase relationship to the oscillator output voltage; and
  (g) means coupled between the potential reference electrode and the current monitoring means and responsive to the output voltage from the monitoring means for substantially cancelling the undesired induced voltage.

15. In apparatus for investigating earth formations traversed by a borehole where a remote potential reference electrode is coupled to the investigating electrical circuitry to provide a reference potential approximating zero volts, the combination comprising:
  (a) an electrode array adapted for movement through the borehole, the array including at least one electrode adapted to emit current into the surrounding earth formations;
  (b) means for supplying current to said at least one electrode;
  (c) monitoring means for providing an output voltage in response to thhe voltage difference between said at least one electrode and the potential reference electrode, the voltage difference including an undesired induced voltage; and
  (d) means responsive to the output voltage from the monitoring means for substantially cancelling the undesired induced voltage.

16. In apparatus for investigating earth formations traversed by a borehole where a remote potential reference electrode is coupled to the investigating electrical circuitry to provide a reference potential approximating zero volts, the combination comprising:
  (a) an electrode array adapted for movement through the borehole, the array including at least one electrode adapted to emit current into the surrounding earth formations;
  (b) means for supplying current of a first phase to said at least one electrode;
  (c) monitoring means for providing an output voltage in response to the voltage difference between said at least one electrode and the potential reference electrode, the voltage difference including an undesired voltage induced in the circuit connection coupling the potential reference electrode with the monitoring means; and
  (d) means responsive to the output voltage from the monitoring means for substantially cancelling any undesired induced voltage in phase quadrature with the supplied current.

17. In apparatus for investigating earth formations traversed by a borehole where a remote potential reference electrode is coupled to the investigating electrical circuitry to provide a reference potential approximating zero volts, the combination comprising:
  (a) an electrode array adapted for movement through the borehole, the array including at least one electrode adapted to emit current into the surrounding earth formations;
  (b) means for supplying current to said at least one electrode;
  (c) monitoring means for providing an output voltage in response to the voltage difference between said at least one electrode and the potential reference electrode, the voltage difference including an undesired voltage induced in the circuit connection coupling the potential reference electrode with the monitoring means; and
  (d) means responsive to the output voltage from the monitoring means for substantially cancelling the undesired induced voltage.

18. In apparatus for investigating earth formations traversed by a borehole, the combination comprising:
  (a) an electrode array adapted for movement through the borehole, the array including at least one electrode adapted to emit current into the earth formations surrounding the borehole;
  (b) a potential reference electrode;
  (c) means for supplying current to said at least one electrode;
  (d) monitoring means for providing an output voltage in response to the voltage difference between said at least one electrode and the potential reference electrode, the voltage difference including an undesired induced voltage;
  (e) means coupled between the potential reference electrode and the monitoring means and responsive to the output voltage from the monitoring means for substantially cancelling the undesired induced voltage; and
  (f) means responsive to the output voltage from the monitoring means for providing an output signal indicative of the resistivity of the surrounding earth formations.

19. In apparatus for investigating earth formations traversed by a borehole, the combination comprising:
  (a) an electrode array adapted for movement through the borehole, the array including at least one electrode adapted to emit current into the surrounding earth formations;
  (b) a potential reference electrode located near the surface of the earth;
  (c) means for supplying a constant current to said at least one electrode;
  (d) monitoring means for providing an output voltage in response to the voltage difference between said at least one electrode and the potential reference electrode, the voltage difference including an undesired voltage induced in the conductor connecting the potential reference electrode with the monitoring means;
  (e) means coupled between the potential reference electrode and the monitoring means and responsive to the output voltage from the monitoring means for substantially cancelling the undesired induced voltage; and
  (f) means responsive to the output voltage from the monitoring means for providing an output signal indicative of the resistivity of the surrounding earth formations.

20. In apparatus for investigating earth formations traversed by a borehole, the combination comprising:
  (a) an electrode array adapted for movement through the borehole, the array including at least one electrode adapted to emit current into the earth formations surrounding the borehole;
  (b) a potential reference electrode located near the surface of the earth;
  (c) means for supplying current to said at least one electrode, said current adapted to be variable;
  (d) monitoring means for providing an output voltage in response to the voltage difference between said at least one electrode and the potential reference electrode, the voltage difference including an undesired induced voltage;
  (e) means coupled between the potential reference electrode and the monitoring means and responsive to the output voltage from the monitoring means for substantially cancelling the undesired induced voltage;
  (f) means responsive to the output voltage from the monitoring means for providing a first output signal indicative of the portion of output voltage from the monitoring means which is in phase with a signal from said current supplying means;
  (g) means responsive to said current from said current supplying means for providing a second output signal indicative of the magnitude of said current; and
  (h) means responsive to said first and second output signals for providing an indication of the resistivity or conductivity of the surrounding earth formations.

21. The method of investigating subsurface earth formations traversed by a borehole comprising the steps of:
  (a) moving an electrode array through the borehole, the array including at least one electrode adapted to emit current;
  (b) supplying current to said at least one electrode for emission into the earth formations surrounding the borehole;
  (c) controlling the current supplied to said at least one electrode in response to the voltage difference between said at least one current-emitting electrode and a potential reference electrode, the voltage difference including an undesired induced voltage; and
  (d) detecting the undesired induced voltage and cancelling a substantial portion of the undesired induced voltage component of said voltage difference.

22. The method of investigating subsurface earth formations traversed by a borehole comprising the steps of:
  (a) moving an electrode array through the borehole, the array including at least one electrode adapted to emit current;
  (b) supplying current to said at least one electrode for emission into the earth formations surrounding the borehole;
  (c) providing an output voltage in response to the voltage difference between said at least one current-emitting electrode and a potential reference electrode, the voltage difference including an undesired induced voltage;
  (d) cancelling a substantial portion of the undesired induced voltage in response to the output voltage; and
  (e) providing an output signal indicative of the resistivity of the surrounding earth formations in response to the output voltage.

23. The method of investigating subsurface earth formations traversed by a borehole comprising the steps of:
  (a) moving an electrode array through the borehole, the array including at least one electrode adapted to emit current;
  (b) supplying current to said at least one electrode for emission into the earth formations surrounding the borehole;
  (c) controlling the current supplied to said at least one electrode in response to the voltage difference between said at least one current-emitting electrode and a potential reference electrode, the voltage difference including an undesired induced voltage and the output voltage of an oscillator;

(d) detecting the portion of voltage supplied to said at least one electrode which is in phase quadrature with the oscillator output voltage; and (e) cancelling a substantial portion of the undesired induced voltage in response to the detected portion of the voltage supplied to said at least one electrode.

24. The method of investigating subsurface earth formations traversed by a borehole comprising the steps of:

(a) moving an electrode array through the borehole, the array including at least one electrode adapted to emit current;

(b) supplying current to said at least one electrode for emission into the earth formations surrounding the borehole;

(c) controlling the current supplied to said at least one electrode in response to the voltage difference between said at least one current-emitting electrode and a potential reference electrode, the voltage difference including an undesired induced voltage;

(d) generating a voltage which is phase dependent on the phase of the emitted current and indicative of the undesired induced voltage; and (e) cancelling a substantial portion of the undesired induced voltage in response to the phase dependent generated voltage.

25. The method of investigating subsurface earth formations traversed by a borehole comprising the steps of:

(a) moving an electrode array through the borehole, the array including at least one electrode adapted to emit current;

(b) supplying current to said at least one electrode for emission into the earth formations surrounding the borehole;

(c) controlling the current supplied to said at least one electrode in response to the voltage difference between said at least one current-emitting electrode and a potential reference electrode, the voltage difference including an undesired induced voltage and the output voltage of an oscillator;

(d) generating a voltage which is phase dependent on the phase of the oscillator output voltage and indicative of the undesired induced voltage; and (e) cancelling a substantial portion of the undesired induced voltage in response to the phase dependent generated voltage.

26. The method of investigating subsurface earth formations traversed by a borehole comprising the steps of:

(a) moving an electrode array through the borehole, the array including at least one electrode adapted to emit current;

(b) supplying current to said at least one electrode for emission into the earth formations surrounding the borehole;

(c) controlling the current supplied to said at least one electrode in response to the voltage difference between said at least one current-emitting electrode and a potential reference electrode, the voltage difference including an undesired induced voltage and the output voltage of an oscillator;

(d) detecting the portion of voltage supplied to said at least one electrode which is in phase quadrature with the oscillator output voltage;

(e) generating a voltage which is phase dependent on the phase of the emitted current and indicative of the undesired induced voltage; and (f) cancelling a substantial portion of the undesired induced voltage in response to the generated voltage.

References Cited

UNITED STATES PATENTS

| | | | |
|---|---|---|---|
| 3,065,407 | 11/1962 | Huddleston et al. | 324—6 |
| 3,113,265 | 12/1963 | Woods et al. | 324—1 |
| 3,337,794 | 8/1967 | Janssen | 324—10 |

RUDOLPH V. ROLINEC, *Primary Examiner.*

G. R. STRECKER, *Assistant Examiner.*